INVENTOR.
WILLIE M. SHOFFNER
BY

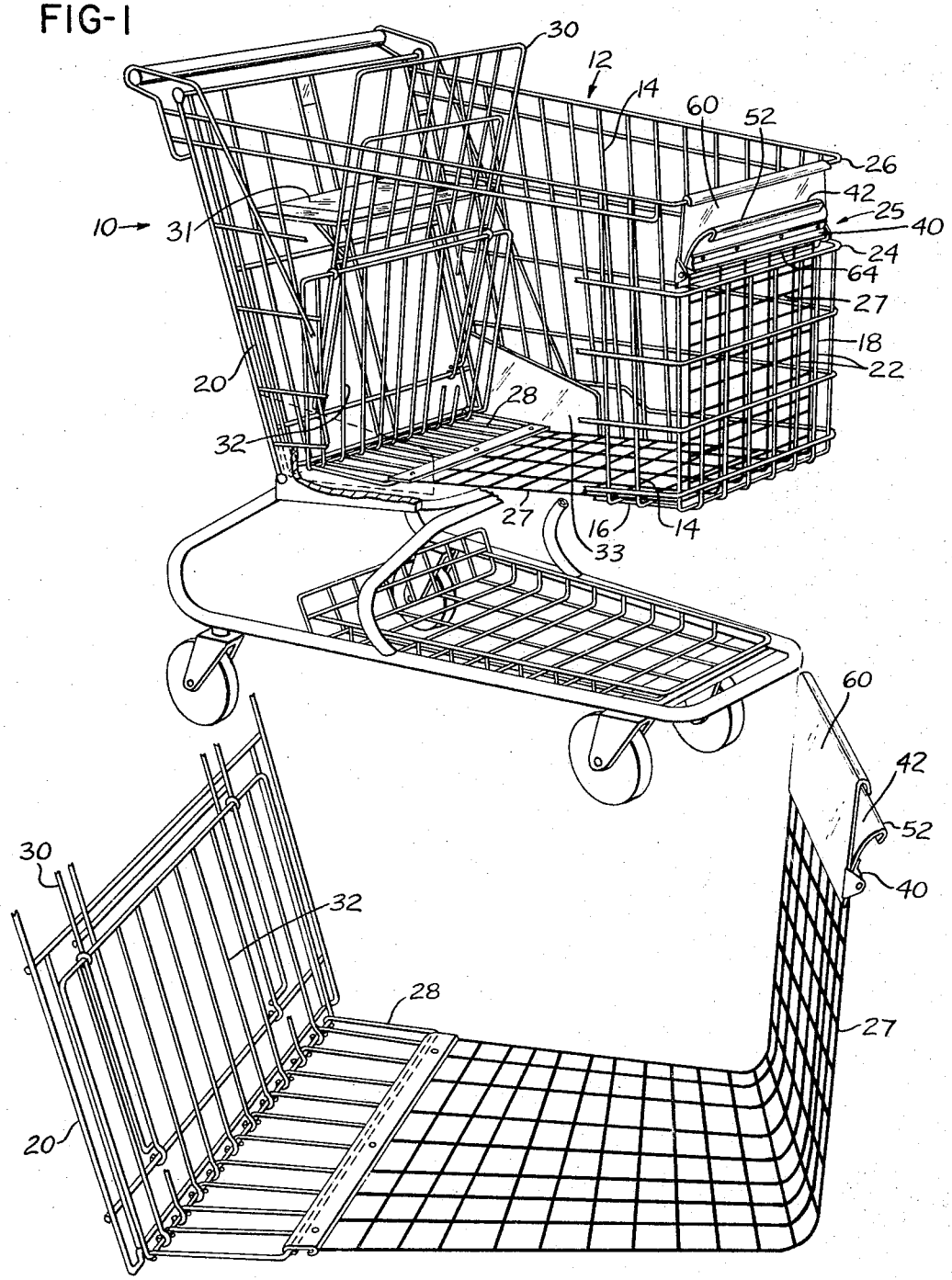

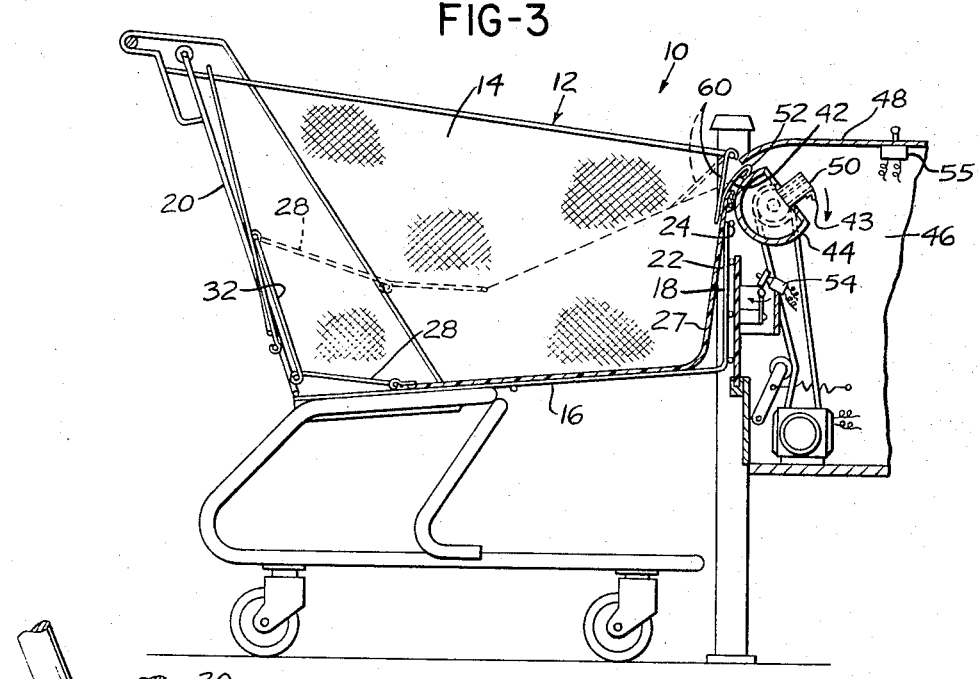
FIG-3
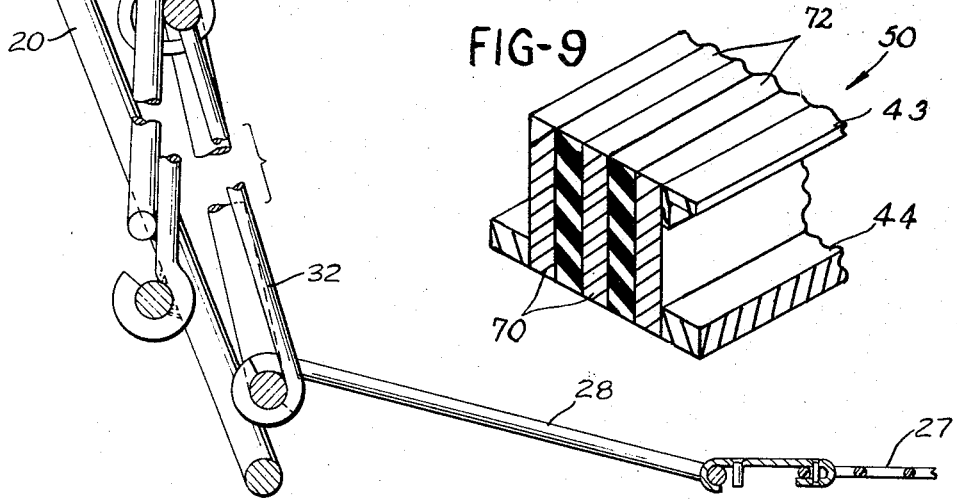
FIG-9
FIG-4

Feb. 20, 1968  W. M. SHOFFNER  3,369,631
MERCHANDISE CART
Filed Jan. 25, 1967  4 Sheets-Sheet 4
FIG-7
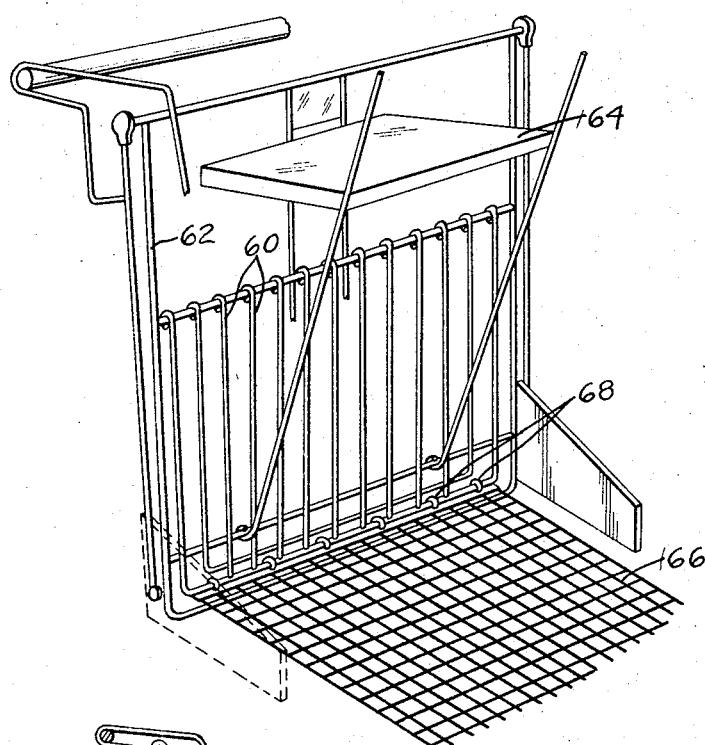
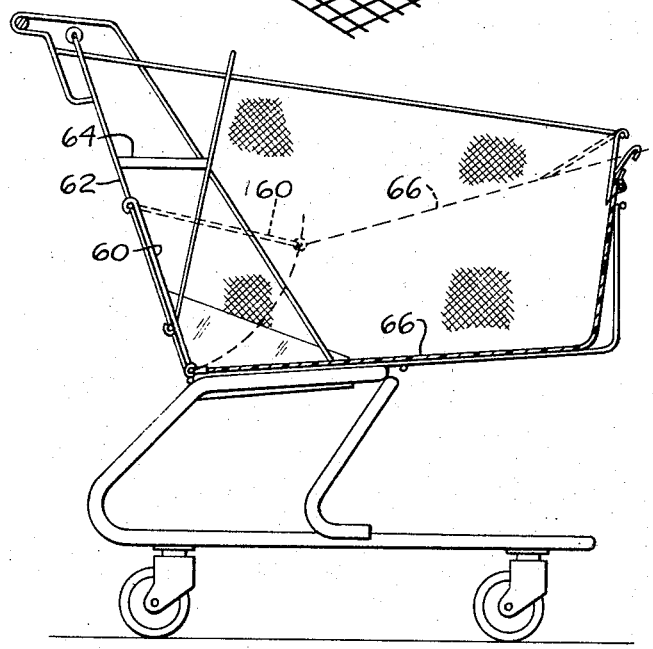
FIG-8
INVENTOR.
WILLIE M. SHOFFNER
BY
Melvin A. Crosby

United States Patent Office 3,369,631
Patented Feb. 20, 1968

3,369,631
MERCHANDISE CART
Willie M. Shoffner, 318 S. Lutheran Church Road, R.R. 2, New Lebanon, Ohio 45345
Filed Jan. 25, 1967, Ser. No. 611,734
14 Claims. (Cl. 186—1)

ABSTRACT OF THE DISCLOSURE

A merchandise cart in which a flexible belt has its leading edge at the top of the front wall of the cart and extends downwardly inside the front wall and backwardly on top of the bottom wall of the cart and is connected at its rear with the bottom edge of an auxiliary grill pivoted to an intermediate point of the back wall. The invention also discloses the use of an auxiliary grill connected with the child's seat of the cart to prevent articles from jamming under the child's seat and shielding member at the back of the side wall of the cart also to prevent articles from jamming in the cart.

This invention relates to merchandise carts and particularly to merchandise carts of the general nature disclosed in my issued Patents Nos. 3,083,791 and 3,286,794.

In the patents above referred to there is shown a merchandise cart and check-out counter combination in which the counter has a drive roll under the top surface at the cart end thereof which is engageable with a flexible member in the upper basket portion of the cart that extends from the bottom of the inwardly swingable back wall of the basket portion forwardly along the bottom wall of the basket portion and up the front wall thereof. Rotation of the roll will draw the flexible member from the basket portion and elevate the articles therein to within easy reach of a check-out clerk at the side of the counter.

Heretofore, a bridge plate was provided on the counter which bridged between the flexible member and the counter top. The bridge member, however, did not always provide a suitable surface over which the articles could move and did not always register properly with the front end of the cart.

One objective of the present invention is the provision of a bridge plate or member to span the space between the flexible member of the cart and the counter top which is always in the proper place and always operates efficiently.

Another object is the provision of the bridge member in the basket portion of the cart so it always is in proper registration with the cart and, furthermore, eliminates the need for any special construction of the cart frame to accommodate a counter carried bridge member.

The flexible member in the cart has heretofore been in the form of a rubber-like belt member. Such belt members are adequately strong and have long life but are heavy and expensive and present cleaning problems.

Another objective of the present invention is, therefore, the provision of a lighter, more inexpensive, and more easily cleaned flexible member of the nature referred to than has heretofore been available.

Heretofore, jamming of articles in the cart in the region where the flexible member joins the back wall was sometimes encountered and it is a further object of this invention to provide a construction which will avoid this difficulty.

Figure 5:
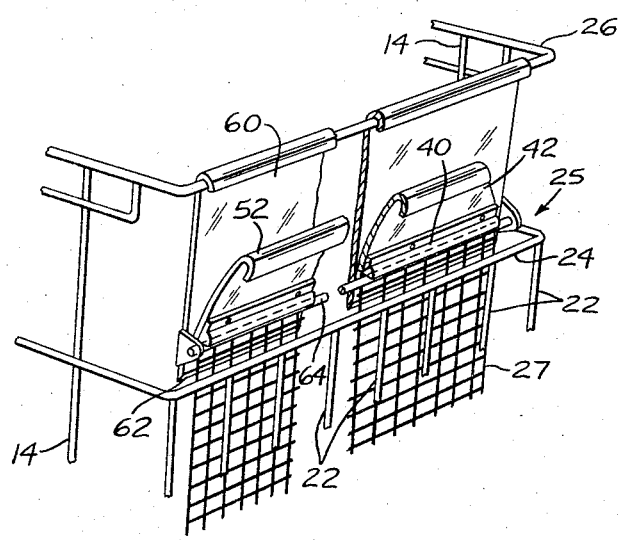
Figure 6:
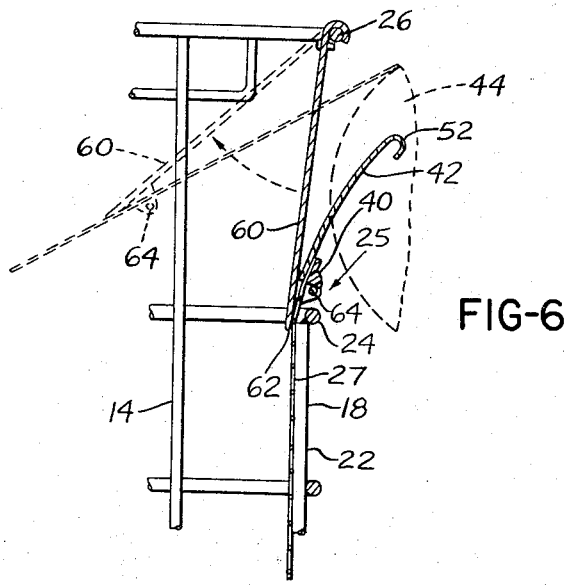

The several objects referred to above, as well as still other objects and advantages of the present invention, will become more apparent reference to the following specification taken in connection with the accompanying drawings in which:

FIGURE 1 is a perspective view of the cart according to the present invention;
FIGURE 2 is a perspective view of the flexible member and shows the connection of the flexible member with the back wall of the cart;
FIGURE 3 shows the cart in position at a check-out counter;
FIGURE 4 is a section drawn at enlarged scale showing the connection of the flexible member to the back wall of the cart;
FIGURE 5 is a perspective sectional view showing the bridge member on the cart and the relation thereof to the flexible member;
FIGURE 6 is another view of the bridge member;
FIGURE 7 is a fragmentary perspective view showing a modification;
FIGURE 8 is a vertical longitudinal section through the cart of FIGURE 7; and
FIGURE 9 shows the magnet mounted on the counter roll.

Referring to the drawings more in detail, the cart, generally indicated at 10, is of conventional construction throughout with regard to the frame and basket portion; except for a slot-like opening provided in the front wall of the basket portion of the cart.

The basket portion 12 of the cart has side walls 14, bottom wall 16, front wall 18, and back wall 20. The walls are made up of intersecting wires, as is conventional, and the vertical wires 22 of the front wall are cut off at the horizontal wire 24 which is the one first below top frame wire 26. This represents the only departure from conventional construction of the cart so that existing equipment for manufacturing carts can be employed.

The slot-like opening 25 formed by cutting off wires 22 receive the leading, or forward, end of flexible member 27 which extends down along the inside of the front wall of the basket portion and then backwardly along the top of the bottom wall thereof to the back wall of the cart.

The back end of the flexible member 27 comprises a rigid grill-like part 28 which has its front end connected to member 27 and its back end connected to back wall 20 of the basket portion at a region thereof spaced upwardly from the bottom wall of the basket portion. Back wall 20 is pivoted to the top wire of the basket portion so as to be swingable inwardly of the basket portion for nesting of the carts and also when the flexible member is drawn from the basket portion.

Back wall 20 has pivoted to the bottom thereof, a panel 30 which, as is known, can be tilted forwardly from the back wall at the top to form, together with a seat member 31, a child's seat. This extra panel can sometimes permit articles to hang up in the basket portion in the back and to prevent this, I provide a grill-like member 32 which, at the top, is slidably connected to panel 30 and, at the bottom, is pivoted to back wall 20 together with the back edge of grill-like member 28. Member 32 prevents articles from jamming against the lower edge of the panel 30.

Further, to prevent small packages from jamming between the back wall and vertical wires of the side walls, I also provide smooth panels, such as at 33, disposed inside the side walls toward the bottom thereof at the back. Panels 33 are substantially triangular and cover the vertical side wall wires when the articles are moving in the forward direction during an unloading operation.

At the leading end of flexible member 27 there is a clip 40 which engages the wire 64 at the bottom of slot-like opening 25 when the flexible member is fed completely into the basket portion. Clip 40 supports the leading end of flexible member 27 so that the larger metal clip 42, also attached to the leading end of the flexible member, is supported for engagement with clip 43 of the drive roll 44 carried by counter 46 beneath the end of counter top 48. Clip 42 has its side bevelled inwardly slightly so it will not hang up on the side walls of the cart.

Roll 46 has magnets 50 therein that attract clip 42, which is magnetic, and the said magnets protrude from the roll so that clip 43 will drivingly engage the turned back edge 52 of clip 42. A reversible drive motor is connected to the drive roll and is connected in an energizing circuit only when a cart is in position at the end of the counter, and the magnetic material of the cart actuates the switch to closed position. With a cart in position, the proximity switch 54 closes and the rotation of roll 46 can then be effected by reversible control of the roll drive motor by the switch 55 on the counter which is under the control of the check-out clerk.

Pivoted to the top frame wire of the basket portion of the cart and hanging down inside the front wall of the basket portion is a bridge member 60. This member hangs down to below slot-like opening 25 and has a bevelled lower edge 62 resting on the surface of flexible member 27. The upper end of the bridge member is closely adjacent the counter top 48 of the counter and thus forms a bridge member bridging from the flexible member to the counter top to facilitate movement of articles from the basket portion to the counter top.

The bridge member is kept in close contact with the flexible member by the rod-like means 64 carried by bridge member 60 near the lower end thereof and engaging the back of flexible member 27.

The flexible member 27, I have found, can advantageously be made of an open mesh material, reinforced and coated if necessary. The open mesh material is cheaper and lighter than the solid belt-like material formerly used and, since it is open, can easily be cleaned. I have found that about ½" mesh material of nylon is suitable for this purpose. The intersecting threads or yarns of the material are about ⅛" in diameter. I have further found that this material can be made extremely strong and dimensionally stable by the application of one or more coatings of flexible epoxy resin thereto.

Also, since the carts taper inwardly toward the front, the open mesh nylon material referred to is of merit because, during the coating operation, the opposite ends can be clamped to their proper respective widths and the material stressed longitudinally so that the sides are straight and inclined toward each other. When the material is then coated with the flexible epoxy resin, and the resin cured, the belt-like members will take a final shape to fit the cart, namely, tapering inwardly from back to front.

In the previously described modification, the belt-like member is attached at the back to the back wall of the cart so that the back wall swings inwardly as the belt-like member is drawn around the roll on the counter.

FIGURE 9 shows more in detail the construction of the roll mounted magnet 50. This member comprises elongated metal bars of magnetic material, indicated at 70, and disposed therebetween are elongated strips of rubber-like magnetized material indicated at 72. The metal bars and the rubber-like strips are alternated and are secured together and are then fixed in any suitable manner to the roll 44 which, as will be seen in FIGURE 3, has one flat side which carries the magnet structure. The clip 43 is secured to the leading side of the magnet structure and is shaped to engage the turn back edge 52 of the metal clip 42 on the leading end of the flexible member. The roll can engage the belt merely by means of clip 43 or merely by means of the magnet if the clip on the belt has an overhanging portion to catch on the leading side of the magnet, but I have found the combination to be very sure in operation and, therefore, quite satisfactory.

FIGURES 7 and 8 show a modification of the cart in which the back wall 162 of the cart schematically shown in these figures, has a panel 160 pivoted to an intermediate portion of the back wall on a transverse axis and swingable inwardly of the basket portion at the bottom edge. The trailing end of belt member 166 is connected as at 168 to the lower edge of panel 160, or a short grill member, as shown at 28 in FIGURES 1, 2, 3 and 4, can be interposed between the back edge of the flexible member and the lower edge of panel 160 forming a part of the back wall of the cart.

As will be seen in FIGURE 8, the panel 160 permits the flexible member to be drawn from the cart even while the child's seat 164 is in open position. This means that the child's seat 164 can be loaded with merchandise, or a child can be seated therein, and the cart can still be unloaded in the described manner by drawing the flexible member therefrom.

FIGURE 7 also shows the structure of the child's seat 164 somewhat schematically. As has been illustrated in FIGURES 1 and 2, the child's seat includes a grill like panel pivoted to rear wall 162 near the bottom and swingable inwardly of the basket portion of the cart at the top. By the arrangement of the present invention, the child's seat does not interfere with the inwardly swinging movement of panel 160 because both of the panels are made up of vertical rods and these are off-set laterally from each other so that both panel 160 and the panel pertaining to the child's seat can swing forwardly and backwardly on back wall 162 of the basket portion independently of each other.

FIGURES 1, 7 and 8 show another feature of the present invention which takes the form of the smooth panel elements 33. These are mounted on the insides of the side walls of the cart and may be confined to the lower rear portions of the side walls. These panel elements shield the articles in the cart from engagement with the side walls of the cart in at least that region of the side walls where the articles are moving substantially horizontally forwardly in the space between the side walls. On occasion articles such as boxes or cans might catch on the side walls as the flexible member is drawn outwardly from the front edge of the basket, and by the provision of the panel elements 33 this can be completely prevented.

It will be understood that this invention is susceptible to modification in order to adapt it to different usages and conditions; and accordingly, it is desired to comprehend such modifications within this invention as may fall within the scope of the appended claims.

What is claimed is:

1. A merchandise cart comprising a frame; a basket portion in the upper part of said frame open toward the top and having front, side and bottom walls, said basket portion also having back wall means at the top edge of said frame so as to be swingable inwardly of said basket portion between the said side walls, a flexible member having a trailing end connected to said back wall means near the bottom edge thereof and extending forwardly along the top of said bottom wall and up the inside of said front wall and terminating near the top edge of the front wall in a leading end, a transverse opening formed in said front wall near the top edge thereof through which said flexible member can be drawn endwise, a clip extending through said opening and attached to the leading end of said flexible member for engagement with a rotatable roll carried by a check-out counter at one end thereof beneath the top surface of the counter, said top surface of the counter being at about the same height as the top edge of said front wall, and a bridge member inside said front wall at the top of said basket portion extending transversely of the basket portion and pivoted near its upper edge to the top edge of said front wall and hanging down inside the said front wall so that the lower edge of the bridge member rests on said flexible member on the side thereof toward the inside of the basket portion and in a region of the flexible member which is beneath the transverse opening in said front wall before the flexible member is drawn through said opening by rotation of said roll, said bridge member including rod means near the said lower edge thereof engaging the side of said flexible member which faces the inside of said front wall to hold the lower edge of said bridge member close to the flexible member in all positions of the members.

2. A merchandise cart according to claim 1, in which said clip includes hook-like means on the side facing said front wall to engage one of said rod means and said front wall along the lower side of said opening when the flexible member is disengaged from said roll so as to support the flexible member in the said basket portion.

3. A merchandise cart according to claim 2, in which the lower edge of said bridge member is bevelled where it engages said flexible member.

4. A merchandise cart according to claim 2, in which at least said front wall is formed of intersecting interconnected vertical and horizontal wires, the top one of said horizontal wires forming a part of said frame, and said lateral opening is formed by terminating said vertical wires at the horizontal wire next beneath the top one thereof.

5. A merchandise cart according to claim 2, in which said flexible member comprises a relatively open plastic mesh element coated with a flexible resin.

6. A merchandise cart according to claim 5, in which said plastic is nylon and said resin is epoxy resin.

7. A merchandise cart according to claim 2, in which said flexible member includes a belt-like forward part and a rigid grill-like rear part disposed between the rear edge of said forward part and the connection of said flexible member to said back wall means, said grill-like part constituting only a fraction of the length of said bottom wall.

8. A merchandise cart according to claim 7, in which said back wall means includes a main panel pivoted at the top to said frame and a second panel inside said main panel and pivoted to the bottom of the main panel and tiltable inwardly of the basket portion at the top away from the said main panel to form a child's seat, and an auxiliary grill member pivoted at its bottom edge to said grill-like part near the rear edge of the grill-like part and slidably connected at its top edge to said second panel.

9. A merchandise cart according to claim 7, in which said back wall means includes a main panel pivoted at the top to said frame and a second panel inside said main panel and pivoted to the bottom of the main panel and tiltable inwardly of the basket portion at the top away from the said main panel to form a child's seat, a further panel pivoted to said main panel just beneath said seat and extending to near the said bottom wall, said grill-like part being pivoted at its back edge to the bottom edge of said further panel, said second panel and said further panel comprising vertical wires connected at their ends so both thereof can swing about their respective pivotal connections with said main panel independently of the other thereof.

10. A merchandise cart according to claim 1, which includes thin flat elements mounted on the inside of the said side walls at least at the bottom thereof in back, to prevent articles from catching on the said side walls as they are moved forwardly in the basket portion by inward movement of said back wall means.

11. A merchandise cart according to claim 1 in which said back wall comprises a lower panel portion on the inside pivoted at its top edge on a transverse axis to the back wall and connected at its lower edge to the trailing end of said flexible member.

12. A merchandise cart according to claim 11 in which said panel portion is a grill-like member having vertical bars, and auxiliary panel pivoted at its bottom edge to the back wall near the bottom thereof and also comprising vertical bars which are offset laterally from the vertical bars of said panel portion whereby said auxiliary panel and said panel portion can tilt on said back wall independently of each other.

13. A merchandise cart according to claim 1 in which said roll carried by the counter has means thereon to engage the clip on the leading end of said flexible member, said means comprising an angle member extending axially of said roll and adapted to engage a turn back edge formed on the tip end of said clip.

14. A merchandise cart according to claim 13 in which said clip is magnetic material and said roll is provided with magnet means for holding the clip adjacent said roll, said magnet means comprising bars extending axially of said roll in planes substantially radially thereto, and strips of rubber-like magnetic material interposed between said bars.

References Cited

UNITED STATES PATENTS

| | | | |
|---|---|---|---|
| 3,039,783 | 6/1962 | Stanley | 186—1.1 |
| 3,083,791 | 4/1963 | Shoffner | 186—1.1 |
| 3,286,794 | 11/1966 | Shoffner | 186—1.1 |

EVON C. BLUNK, *Primary Examiner.*

H. C. HORNSBY, *Assistant Examiner.*